US008744878B1

(12) United States Patent
Bierbower et al.

(10) Patent No.: US 8,744,878 B1
(45) Date of Patent: Jun. 3, 2014

(54) METHOD FOR USING FINANCIAL INCENTIVES WITH MEMBER ENGAGEMENT METRICS TO REDUCE HEALTH CARE CLAIM COSTS

(75) Inventors: Beth Bierbower, New Albany, OH (US); Traci Elliot, Prospect, KY (US); Beth Grice, Louisville, KY (US); Khalid Nazir, Louisville, KY (US); Rick Remmers, Louisville, KY (US); Benjamin Slen, Louisville, KY (US); Melissa L. Weaver, Louisville, KY (US); Patrick Bryan, Prospect, KY (US)

(73) Assignee: Humana Inc., Louisville, KY (US)

( * ) Notice: Subject to any disclaimer, the term of this patent is extended or adjusted under 35 U.S.C. 154(b) by 1421 days.

(21) Appl. No.: 12/101,344

(22) Filed: Apr. 11, 2008

(51) Int. Cl.
*G06Q 40/00* (2012.01)
(52) U.S. Cl.
USPC .................................................. 705/4
(58) Field of Classification Search
USPC ............................................ 705/1, 1.1, 2, 4
See application file for complete search history.

(56) References Cited

U.S. PATENT DOCUMENTS

| | | | |
|---|---|---|---|
| 5,359,509 A | 10/1994 | Little et al. | |
| 5,544,044 A | 8/1996 | Leatherman | |
| 5,890,129 A | 3/1999 | Spurgeon | |
| 6,088,677 A | 7/2000 | Spurgeon | |
| 6,112,183 A | 8/2000 | Swanson et al. | |
| 6,615,181 B1* | 9/2003 | Segal | 705/4 |
| 7,246,089 B2* | 7/2007 | Hoppenstein | 705/35 |
| 2005/0222922 A1* | 10/2005 | Lynch | 705/30 |
| 2005/0234742 A1* | 10/2005 | Hodgdon | 705/2 |
| 2006/0064331 A1* | 3/2006 | Odermott et al. | 705/4 |
| 2006/0106658 A1* | 5/2006 | Johanson et al. | 705/7 |
| 2006/0129436 A1 | 6/2006 | Short | |
| 2006/0149595 A1* | 7/2006 | Williams et al. | 705/2 |
| 2007/0233515 A1* | 10/2007 | Mehus et al. | 705/2 |
| 2008/0059251 A1* | 3/2008 | Biorge | 705/4 |

OTHER PUBLICATIONS

SMS; School Management Services; "Health Care Trend"; Jul. 1, 2006 thru Jun. 30, 2007; pp. 1 and 2.*
Roy Harmon III; ERISA Group Health Plan Administration; Health Plan Law; Form 5500; 2007; pp. 1-4.*
Hahn, Penny, Health Care Consumer: Passive or Active?, Presentation at Society of Actuaries Health Meeting, Jun. 2005, 16 pages, Humana Inc., Louisville, Kentucky.
What You Need to Know!, Underwriting Guidelines for Settlement Process, Mar. 2007, 1 page, Humana Inc.

(Continued)

*Primary Examiner* — Ella Colbert
(74) *Attorney, Agent, or Firm* — Standley Law Group LLP

(57) ABSTRACT

A health care plan system and method designed to reduce future claims costs through financial incentives with member engagement metrics. Targets are pre-set for member engagement metrics. Claims cost targets for the sponsor are set based on the sponsor meeting member engagement targets. A percentage of health care plan base administrative fees are at risk based on the sponsor's claims cost performance in relation to the claims cost target. If the claims cost target is missed, the health plan administrator repays or reduces administrative fees charged to the sponsor. If the claims cost target is met, the sponsor pays additional fees to the health plan administrator. Base administrative fees are also repaid or reduced if the health care plan administrator fails to meet service performance targets. The sponsor is appraised on progress of member engagement and service performance metrics through scorecards that are sent during the plan year.

20 Claims, 8 Drawing Sheets

(56) References Cited

OTHER PUBLICATIONS

SmartResults, A comprehensive solution for 300+ self-funded groups, Offered by the Humana Family of Insurance and Health Plan Companies, Apr. 2007, 1 page, Humana Inc.

Humana Launches SmartResults—a Unique, Integrated, Multi-Year Approach That Assures Employers Will Save on Health Care Costs by Helping Employees Get Healthier, Press Release, Apr. 19, 2007, Business Wire, http://www.businesswire.com/portal/site/google/index.jsp?ndmViewID=news_view&newsl . . . .

Melville, Bill, Humana: Predictable Trends or Your $$ Back, HealthLeaders-InterStudy, Texas Health Plan Analysis, Summer 2007, vol. 9, No. 3, pp. 9-10, Nashville, Tennessee.

* cited by examiner

FIG-4

Consumer Engagement Measurements

Customer Name: Acme Pipe and Supply
Customer #: 123456
Plan Type: Transitional
Plan Year: Oct 1, 2007 thru Sep. 30, 2008
Report Date: April 1, 2008

| Program | Weight | Target | 30 days post-effective | Mid-year | | Progress against target |
|---|---|---|---|---|---|---|
| Valid Phone Numbers | 0.35 | 90% | 92% | 93% | | |
| Health Assessment | 0.20 | 50% | 2% | 32% | | |
| Clinical Programs | 0.30 | 60% | n/a | 48% | | |
| *Maximize Your Benefit* | 0.15 | 25% | n/a | 28% | ◎ | |
| Program Participation Sub-total | 1.0 | 63.25% | 32.60% | 57.55% | | |
| Previous Clinical Program Participation Bonus | | | | n/a | | |
| Wellness Program Bonus | | | | 3% | | |
| Program Participation Grand Total | | | | 60.55% | ◎ | |

Target Cap= [target (63.25%) / participation score (60.55%)] x minimum trend (7.50%)    7.80%

| Clinical Program Portfolio | Identified Eligible | Participating | |
|---|---|---|---|
| Coronary Artery Disease | 8 | 3 | 38% |
| Congestive Heart Failure | 2 | 1 | 50% |
| Asthma | 8 | 4 | 50% |
| Cancer | 14 | 10 | 71% |
| Diabetes | 10 | 4 | 40% |
| Rare Diseases | 1 | 1 | 100% |
| End-stage Renal Disease | 0 | 0 | 0% |
| Neonatal Intensive Care Unit | | | |
| Chronic Kidney Disease | | | |
| Beginnings | | | |
| Transplant Management | | | |
| Case Management | | | |
| Personal Nurse | | | |

| | Identified Eligible | Participating | |
|---|---|---|---|
| Neonatal Intensive Care Unit | 3 | 3 | 100% |
| Chronic Kidney Disease | 0 | 1 | 100% |
| Beginnings | 15 | 6 | 40% |
| Transplant Management | 7 | 6 | 86% |
| Case Management | 19 | 7 | 37% |
| Personal Nurse | 20 | 6 | 30% |

*Maximize Your Benefit*

| Top 5 Campaigns |
|---|
| 1 Stress |
| 2 Nutrition |
| 3 Fitness |
| 4 Back Pain |
| 5 Women's Health |

| Contacts | Conversions | |
|---|---|---|
| 1521 | 431 | 28% |

All campaigns

Provider Network Discount Summary

| | Target | Renewal | |
|---|---|---|---|
| Provider network discount | 30% | 30% | ◎ On target |

Service Level Performance

| | | | | | Customer Name: | Acme Pipe and Supply |
|---|---|---|---|---|---|---|
| | | | | | Customer #: | 123456 |
| | | | | | Plan Type: | Transitional |
| | | | | | Plan Year: | Oct 1, 2007 thru Sep. 30, 2008 |
| | | | | | Report Date: | April 1, 2008 |

| Service Level | Description | Target | Mid-year | Annual Service Levels | |
|---|---|---|---|---|---|
| Cycle Time | (% of claims processed in 14 days or less) | 90% | 91% | 91% | ◎ On target |
| Financial accuracy | (dollars paid correctly) | 99% | 98% | 98% | |
| Payment accuracy | (% of claims paid correctly) | 97% | 98% | 98% | ◎ On target |
| Telephone response | (% of calls answered in 20 seconds or less) | 80% | 76% | 76% | |
| Abandonment rate | (% of callers hanging up before reaching rep) | <3% | 4% | 4% | |
| Account installation | (% of ID cards issued before effective date) | 98% | — | 99.60% | ◎ On target |

Consumer Engagement Measurements

Customer Name: Acme Pipe and Supply
Customer #: 123456
Plan Type: Transitional
Plan Year: Oct 1, 2007 thru Sep. 30, 2008
Report Date: November 1, 2007

| Program | Weight | Target | 30 days post-effective | Progress against target |
|---|---|---|---|---|
| Valid Phone Numbers | 0.35 | 90% | 92% | |
| Health Assessment | 0.20 | 50% | 2% | |
| Clinical Programs | 0.30 | 60% | n/a | |
| *Maximize Your Benefit* | 0.15 | 25% | n/a | |
| Program Participation Sub-total | 1.0 | 63.25% | 32.60% | |
| Previous Clinical Program Participation Bonus | | | n/a | |
| Wellness Program Bonus | | | n/a | |
| Program Participation Grand Total | | | 32.60% | |

Target Cap= [target (63.25%) / participation score (32.60%)] x minimum trend (7.50%)

| Clinical Program Portfolio | Estimated Participation |
|---|---|
| Coronary Artery Disease | 7 |
| Congestive Heart Failure | 0 |
| Asthma | 0 |
| Cancer | 11 |
| Diabetes | 7 |
| Rare Diseases | 1 |
| End-stage Renal Disease | 0 |

| | Estimated Participation |
|---|---|
| Neonatal Intensive Care Unit | 0 |
| Chronic Kidney Disease | 0 |
| Beginnings | 4 |
| Transplant Management | 0 |
| Case Management | 10 |
| Personal Nurse | 14 |

*Maximize Your Benefit*

| Top 5 Campaigns |
|---|
| 1 |
| 2 |
| 3 |
| 4 |
| 5 |

All campaigns | Contacts | 0 | Conversions | 0 | 0% |

Customer Name: Acme Pipe and Supply
Customer #: 123456
Plan Type: Transitional
Plan Year: Oct 1, 2007 thru Sep. 30, 2008
Report Date: November 1, 2007

|  | Target | Renewal | |
|---|---|---|---|
| Provider network discount | 30% | 30% | ◎ On target |

Service Level Performance

| Service Level | Description | Target | Annual Service Levels | |
|---|---|---|---|---|
| Cycle Time | (% of claims processed in 14 days or less) | 90% | 0% | |
| Financial accuracy | (dollars paid correctly) | 99% | 0% | |
| Payment accuracy | (% of claims paid correctly) | 97% | 0% | |
| Telephone response | (% of calls answered in 20 seconds or less) | 80% | 0% | |
| Abandonment rate | (% of callers hanging up before reaching rep) | <3% | 0% | |
| Account installation | (% of ID cards issued before effective date) | 98% | 99.60% | ◎ On target |

FIG-7

METHOD FOR USING FINANCIAL INCENTIVES WITH MEMBER ENGAGEMENT METRICS TO REDUCE HEALTH CARE CLAIM COSTS

CROSS-REFERENCE TO RELATED APPLICATIONS

None.

FIELD OF THE INVENTION

The embodiments of the present invention relate generally to health care plans and more specifically to a health care plan program designed to reduce future health care claims costs using financial incentives with member engagement metrics.

BACKGROUND OF THE INVENTION

Health care spending in the US has risen every year for decades. The factors that influence health care spending are numerous and include advances in medical technologies as well as population changes and changes in disease prevalence. Many heath care costs are covered through third party health care plans that plan sponsors (e.g., employers) offer to their members (e.g., employees). The high and growing cost of health care is a significant issue for sponsors of health care plans to cover many of the costs of health care provided to their members. Health care costs are also a significant issue for members that are increasingly asked by sponsors to share a portion of their own health care costs. Members are asked to contribute to their own health care costs in the form of higher premiums, deductibles, and co-payments under their health plans.

Identifying ways to reduce health care costs and spending is beneficial to both the sponsors as well as the members that are asked to share in the costs of their health care plans. Health plans also benefit from lower health care costs and therefore, often develop and offer programs that help sponsors and members to minimize their health care costs. For example, some health plans include wellness programs and services to help members improve their health through better eating and exercise. Although member participation in such programs may help to reduce health care costs for the member as well as the member's sponsor or employer and health plan, participation in such programs may be limited because the program is viewed as primarily a benefit for the member. The health care plan administrator may provide information about the program and sponsors may encourage their members to take advantage of such a program but other steps that could result in greater participation rates are not taken. Participation in other programs offered by the health plan administrator such as clinical programs, disease management programs, and prescription drug programs may be limited for similar reasons.

Although there are many health plan administration programs that are intended to reduce health care costs, the cost benefits for all parties are dependent upon member participation. Increasing participation requires collecting information about members to identify their health needs and providing information about health care programs that the health care plan administrator offers to determine which ones best meet the members' needs. Communication between members and health care plan administrators is important to increasing member participation. As a result, it is important for health care plan administrators to have accurate contact information as well has accurate health information about members so that members can receive information about available programs and are enrolled in the programs that best meet their needs.

Getting sponsors such as employers and their members (i.e., employees) to provide the information that is needed to increase participation in health programs can be difficult. For example, sponsors may ask their members to provide the required information to the health plan administrator but are otherwise uninvolved in the information collection. Members may be reluctant to provide contact information because they do not understand why it is needed or how it will be used. As a result, it can be difficult for the health care plan administrator to provide members with information that is not only beneficial to their health but also helpful in reducing health care costs. There is a need for a health care plan program that promotes more effective communication between a health care plan administrator and its members. There is a need for a health care plan program that engages members and establishes and tracks measurements related to member engagement. Finally, there is a need for a health care plan program that provides incentives for parties involved in the health plan—the health care plan administrator, the health care plan sponsor, and the health care plan members—to engage members in programs that are beneficial for their health, to set targets related to the health plan and member engagement, and to track metrics related to the health plan.

SUMMARY OF THE INVENTION

Health care claims costs are reduced by using financial incentives that incorporate member engagement metrics. The member engagement metrics are used in association with a health care plan program that sets targets related to the health plan and offers financial incentives to health plan sponsors for meeting the targets. The member engagement targets include goals to increase member participation in health care plan clinical and other outreach programs. Data may be collected and analyzed over several years to determine a claims cost trend and determine the effectiveness of the plan. As a result, the sponsor sees improved health outcomes for members and a reduced claims cost trend.

In an example embodiment of the present invention, the financial incentive is a percentage of the health care plan administrator's base administrative fees charged to the plan sponsor which are placed at risk based on pre-set targets. An example program according to the present invention guarantees a per member per month claims cost target and service performance target placing a percentage (e.g., 40%) of base administrative fees at risk based on pre-set targets (e.g., 20% for claims costs and 20% for service performance). The specific trend factors used to determine the per member per month claims cost target each year may differ based on the sponsor's plan design and on the level of member engagement achieved as measured using various metrics. Claims cost target guarantees are set using a trend factor (e.g., ranging from a target of 6% up to market trend). Twenty percent of the base administrative fees may be placed at risk for the claims cost target. Service performance is also measured based on various metrics. Twenty percent of the base administrative fees are placed at risk for service performance as well.

In addition to the novel features and advantages mentioned above, other features and advantages will be readily apparent from the following descriptions of the drawings and exemplary embodiments.

BRIEF DESCRIPTION OF THE DRAWINGS

FIGS. 4-7 are illustrations of the claims cost and service performance scorecards issued at various times through a plan year.

DETAILED DESCRIPTION

Figure 1:
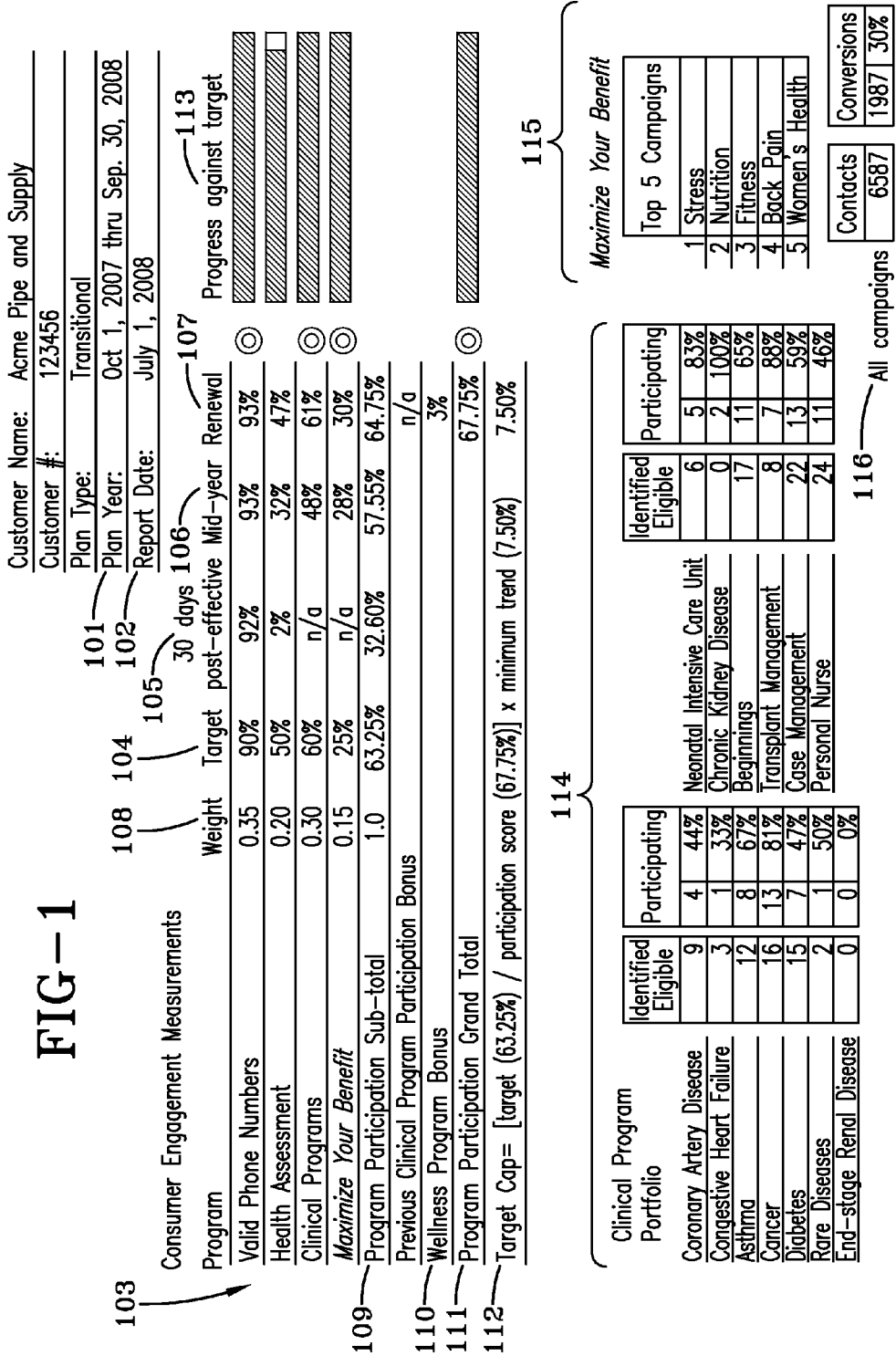
FIG. 1 is an illustration of a claims cost scorecard.

Exemplary embodiments are described with respect to three parties: the health care plan administrator (the health plan), the sponsor (employer), and the member. A "member" is any party covered under a given health care plan. The term "member" may include not only the actual policy holder, but also spouses, domestic partners, and dependants of the policy holder that are also covered under the health plan. A "sponsor" works with a "health care plan administrator" to determine which type of health care plan to offer to its members. The "health care plan administrator" or the "health plan" may offer many types of health care plans to meet the needs of many different sponsors and their members. Other parties such as brokers may also participate in the plan and share in costs savings that are achieved using the financial incentives with member engagement metrics.

Member engagement in the health care plan offered by the sponsor is used to improve health outcomes and drive down health care costs. To create that engagement, the health care plan administrator and health care plan sponsor partner to engage the members in health-related activities such as participation in outreach programs and health care programs that meet their health needs. Sponsors may be asked for a multi-year commitment to the health care plan administrator and to supply the health care plan administrator with information to facilitate member engagement as well as data about claims and program participation. The terms and conditions of the program may be provided in a contract that the health care plan administrator and sponsor execute. Sponsors may purchase from the health care plan administrator integrated health benefits packages that include medical, pharmacy, clinical, and behavioral health.

Targets are set and actual data are compared against the targets to measure the sponsor's progress toward claims costs reduction goals. As would be apparent to one of skill in the computer arts, a server may be programmed to access target and actual data and to complete calculations and comparisons as described herein. Different types of health care plans may be subject to the claims cost and service performance targets. Different targets may be set based on the type of health care plan offered by a sponsor. Health care plans may include traditional, transitional, or consumer directed. Definitions of such plans are shown in Table 1.

TABLE 1

Health Care Plans

| Health Care Plan | Description |
| --- | --- |
| Traditional | Health Maintenance Organization (HMO) - covering in-network services |
| | Preferred Provider Plan (PPO) - benefits for covered services from any provider |
| | Point of Service Plan (POS) |
| | (Other non-consumer directed health plan) |
| Transitional | Traditional plus a consumer directed health plan (CDHP). A CDHP is a high deductible health plan (HDHP) with a Health Savings Account (HSA), a Personal Care Account (PCA), or basic PPO for major unexpected illness or injury. |

TABLE 1-continued

Health Care Plans

| Health Care Plan | Description |
| --- | --- |
| Consumer Directed | Online tools and information to compare plans and select the plan that works for the member's health care needs and budget. May include a total of three plans and two CDHPs. |

The health care plan administrator may establish additional eligibility requirements such as a minimum number of eligible members (e.g., 300), a minimum number of participants (e.g., 75% of eligible members), self-funding program, and turnover rate below a specified maximum (e.g., 30%). Other eligibility criteria may apply depending upon the plan administrator.

The health care plan administrator may further require cooperation from the sponsor to facilitate various required communications between the plan administrator and members. For example, the plan administrator may require the sponsor to coordinate and offer at the sponsor's facility educational programs and training programs for using various health care planning and cost tools. The plan administrator may also ask the sponsor to distribute email and other types of printed communications to members. Pre-packaged communications and standard materials may be distributed to members through the sponsor or directly to members to further educate and engage members in their health care.

In an example embodiment in which the claims cost target is a percentage of costs, the health plan administrator refunds a portion of the base administrative fees if the sponsor's claim costs rise faster than the claims cost target during the applicable plan period. The claims cost targets that the health care plan administrator commits to are tied to the sponsor's performance on the engagement metrics. This relationship provides an incentive for the sponsor to partner with the administrator in engaging members in various health-related activities that facilitate improvements in health. Administrative fees are placed at risk to ensure that the administrator has the same incentive for claims cost performance that the sponsor has. Administrative fees that may be placed at risk in an example embodiment include fees normally charged to the health care sponsor such as those listed in Table 2.

TABLE 2

Base Administrative Fees at Risk

| Fee |
| --- |
| Medical Claims Administration |
| Utilization, case Management, Radiology and Transplant Management, Personal Nurse |
| Predictive Modeling |
| Eligibility Management |
| Pharmacy Administration |
| Core Wellness Programs |
| Toll Free Access to Customer Service via telephone, IVR, and Internet |
| Ongoing ID Card Administration |
| State Surcharge Reporting |
| Annual Plan Sponsor Summary for 5500 Filing |
| Bank and Funding Arrangements |
| Employee and Enrollment Communication Materials |
| Standard Monthly Reporting Package |
| Summary Plan Description Preparation |
| Internet Access to Summary Plan Description |
| Designated Service Unit |

Claims cost targets for each sponsor may be determined partially by the level of member engagement. In an example embodiment, member engagement may be measured by four factors:

1. valid telephone numbers;
2. participation in health assessment;
3. participation in clinical programs; and
4. participation in pharmacy cost reduction plans or other plans designed to reduce costs.

Member engagement metrics may further include bonus metrics related to previous participation in clinical programs or participation in wellness programs. The claims costs targets related to member engagement identified above are exemplary only. Different targets may be established to meet other needs as determined by the health care plan administrator and sponsor. Each member's participation in the listed activities can result in better health outcomes as well as reduced claims costs.

Service performance targets may be determined according to services provided to members by the health care plan administrator. In an example embodiment, service performance targets may be measured based on six metrics:

1. claims cycle time;
2. financial accuracy;
3. payment accuracy;
4. telephone response rate;
5. telephone abandonment rate; and
6. account installation.

Service performance may be measured by the health care plan administrator's performance company-wide or by the health care plan administrator's performance on the sponsor's account. A combination of company-wide and account specific information may also be used. For example, all metrics except for account installation may be measured company-wide, as account installation may be more easily tracked and compared.

Details regarding member engagement metrics, claims cost target, and service performance targets are provided in relation to a scorecard that is provided to sponsors several times a year. The scorecard provides a summary of the targets and performance in relation to the targets. Sponsors participate in the program for several years and the scorecard allows them to see a claims cost trend over the years and how close they are to meeting the targets.

A trend factor is used at settlement (typically 120 days following the end of the first contract period) to set the claims cost target (e.g., on a per member per month basis) for the group of members. The trend factor is based on the claims costs variables identified previously and may differ depending upon the type of plan in effect (e.g., traditional, transitional, consumer directed). The claims cost target may be reset annually or according to another applicable plan period, but standard trend assumptions are reviewed every few months. The base administrative fees placed at risk are based on the calculated claims cost target.

A risk "corridor" or range may be applied to the calculated claims cost target to pro-rate the amount of the base administrative fees at risk based on the degree to which claims costs miss the target. In an example embodiment, scorecard progress reporting is provided approximately quarterly to the sponsor. A final scorecard for the year where the trend factor is finalized may be provided to the sponsor in advance of the renewal each year (e.g., 120 days). The measurement of actual claims costs against the target may be completed within a certain period of time after the renewal each year (e.g., 120 days) so that sufficient data to complete the analysis is available.

Referring to FIG. 1, a claims cost scorecard illustrating the performance of a sponsor in meeting targets for an example embodiment is shown. The scorecard shows the plan year 101 start and end dates of the current health plan. The report date 102 provides the date that the claims cost scorecard was issued. Member engagement factors 103 are each listed individually so that each one may be assigned a specific target 104 and weight 108. Participation may be tracked throughout the plan year 105, 106, 107.

The example scorecard shows the member engagement factors 103 as measured three times during the plan year. The first time is shown in the 30 days post-effective column 105 which is one month after the current plan is initiated. The second time is shown in the mid-year column 106 which is six months after the current plan is initiated. The final time is shown in the renewal column 107 which is nine months after the current plan is initiated. As shown by the plan year 101 and report date 102 (e.g., Jul. 1, 2008), FIG. 1 shows the measurements based on nine months of plan operation, (i.e., the renewal column 107 is the most current member measurement data).

Each of the member engagement factor targets 104 is multiplied by a specified weight 108 and then summed to determine a single target in the sub-total row 109 (63.25%). At the same time, each of the member engagement factors for each time period (30 days post-effective 105, mid-year 106, and renewal 107) are multiplied by the same specific weight 108 and then summed, which allows each of the member engagement factors for the time period to be combined into a single sub-total in the sub-total row 109 (64.75%).

A first member engagement factor according to an example embodiment is a valid telephone number. The valid telephone numbers factor shows the percentage of members that are 18 years of age or older and have submitted a valid telephone number. A valid telephone number meets criteria such as non-blank, ten digits, numeric data, not all repeating digits (e.g., 444444444), and non-sequential (e.g., 1234567890). Valid telephone numbers are important to member participation because they allow the health care plan administrator to contact members to educate them about and enroll them in clinical programs, pharmacy cost reduction plans, and other outreach programs and engagement activities that are known to improve health outcomes thereby reducing costs. Initially, members may be reluctant to provide such information because they do not understand who will contact them and why. Sponsors may work with the health care plan administrator to explain to members the importance of providing accurate contact information and authorizing use of the information so that they can benefit from the clinical and outreach programs. The actual percentage of participation (e.g., 93%) may be calculated by dividing the number of members that have submitted valid telephone numbers by the total number of members.

The health care plan administrator and sponsor may use spreadsheets to communicate telephone numbers to an information technology department that enters the member telephone numbers in a database. Telephone numbers may be collected during an enrollment process or provided to customer service agents. From time to time, requests for missing telephone number data may be transmitted to the sponsor. Updated telephone numbers may be provided in the spreadsheet and communicated again to the information technology department for entry in the database. Individual members can contact customer service agents directly to add or update their contact information including telephone number.

A second member engagement metric according to an example embodiment is the health assessment. To complete the health assessments, members provide information about their current health. The health assessment is a tool that evaluates each member's health status and facilitates the earliest possible identification of clinical conditions. The health assessment engages members in evaluating and managing their health and may be used to provide health guidance and medical direction to members. When members provide information about their health, the health care plan administrator can identify members for participation in clinical programs earlier, sometimes before a claim is ever submitted. The health assessment may be administered as an online questionnaire or an exam/questionnaire that is completed by telephone or in person. Members may be provided with a personalized report that identifies their health risks and provides steps for improvement. Sponsors may provide their members with incentives to complete health assessments and thereby, increase participation rates and get closer to the pre-set target.

The target for participation in the health assessment may be a percentage of members that complete the health assessment. Completion of the health assessment may entail answering all of the questions in the assessment. The actual percentage may be calculated by dividing the total number of members that complete the health assessment by the total number of members covered under the health plan.

A third engagement metric according to an example embodiment is participation in clinical programs. Clinical programs are designed to assist members that are considered to be at risk for high claims cost in the future. Results of the health assessments are used to match members with clinical programs. The health assessments identify members that may suffer from disease or addiction which, with proper treatment and guidance, can be managed more productively in the long term. Examples of members at risk for high claims cost include those that suffer from various diseases or chronic conditions. Further examples include members that are smokers or obese.

Clinical programs may be directed to disease management such as coronary artery disease, congestive heart failure, cancer, asthma, chronic kidney disease, diabetes, rare diseases, neo-natal intensive care, end-stage renal disease. Programs may also be directed to pregnancy, transplant management, case management or other special topics or conditions. They may further include wellness programs that are designed to teach members about healthy lifestyles and habits. Programs may also encourage personal clinical care regarding age and gender specific preventive care (flu shots, etc.), maintaining a personal health record, and identifying transition of care/continuity of care needs, including both medical and pharmacy.

Associates from the health care plan administrator's clinical programs reach out to members in an effort to assist sponsors with reaching their clinical participation goals. Potential methods of outreach include welcome calls to new members that also include providing information about clinical programs, early identification and outreach to members based on information they provide during enrollment or as a result of other contacts, outreach to members based on their health assessments, and follow-up calls to members that have been contacted previously to help answer additional questions.

The target for participation in clinical programs may be a percentage that is defined as the percent of members who are eligible for clinical programs that participate in them. Eligible members are those that have been referred to a clinical program. Participants are those members that are determined by the clinical program to be enrolled in it. Ineligible members are those members that are members in another clinical program in the hierarchy. The actual percentage may be calculated by dividing the number of clinical participants by the difference between the number of referred members and the number of ineligible members.

Other consumer engagement metrics according to an example embodiment relate to other optional programs or plans that may further help a sponsor reduce claims costs. Such programs may be labeled "maximize your benefits." An example plan is a pharmacy cost reduction plan that uses communications such as letters, emails, and voice activation technology to reach out and help members understand ways to control their prescription drug costs by providing information on lower-cost options and talking to their doctor about what is appropriate for their health care needs. Over the years, the use of high-cost, brand name drugs has increased as the amount of direct-to-member advertising by the pharmaceutical industry has grown. This increase indicates members and physicians are requesting these drugs because they are not aware of lower cost alternatives or because of brand loyalty. An outreach program that educates members on alternative medications in the same therapeutic class (alternative brand or generic) may be an important part of a strategy for reducing health care costs.

For a pharmacy cost reduction campaign, the "maximize your benefit" communications are timely messages sent based on the specific prescriptions that a member has filled. If the member is using a prescription on a target list, he or she will receive an initial communication. If the member has not transitioned to a lower-cost alternative, a follow-up communication may be sent in approximately six months. A member may receive multiple messages if he or she takes more than one prescription that is on the target list. The target list may include cholesterol-lowering drugs such as Zocor®, Lipitor®, and Crestor®. An alternative is generic simvastatin. As new drugs are released to the market, they are evaluated for the target drug list. For example, when a brand drug becomes available as a generic, the brand may be added or if a new form of a brand drug is launched, such as Ambien® with a controlled release (Ambien CRC)) the drug may be added. Certain medications often have a higher cost but do not have any additional benefit to the consumer other than convenience. By switching to a lower cost alternative, claims costs related to prescription drug costs may be reduced.

The target for participation in the pharmacy cost reduction plans may be calculated as a percent of eligible members who change to a preferred medication when a recommendation is received for a drug conversion. The actual percentage may be calculated by dividing the number of members who changed to a preferred medication by the number of members who were reached by the pharmacy cost reduction plan messages.

The bonus rows 110 allow bonus points for bonus programs to be combined with the sub-totals from the program participation sub-total row 109. Bonus points may be achieved by previous participation in clinical programs and by participation in wellness programs. The amounts in the renewal column 107 sub-total rows 109 and bonus row 110 are combined to produce a grand total 111. The target cap 112 is shown in the last row. The target cap is based on the target participation score divided by the actual participation score multiplied by a minimum trend factor.

The progress against target section 113 provides a graphical representation of the member engagement performance versus the targets. The clinical program portfolio 114 provides detailed information on the clinical programs, the number of eligible members for each program, the number of eligible members participating in the clinical programs, and the percent of eligible members who are participating in the clinical programs.

The target or trend cap section 112 illustrates the calculation of a target or trend cap. A to campaigns section of the scorecard identifies the to health campaigns 115 for the sponsor. An all campaigns section of the scorecard 116 provides details and numbers for all of the sponsor's campaigns.

Figure 2:
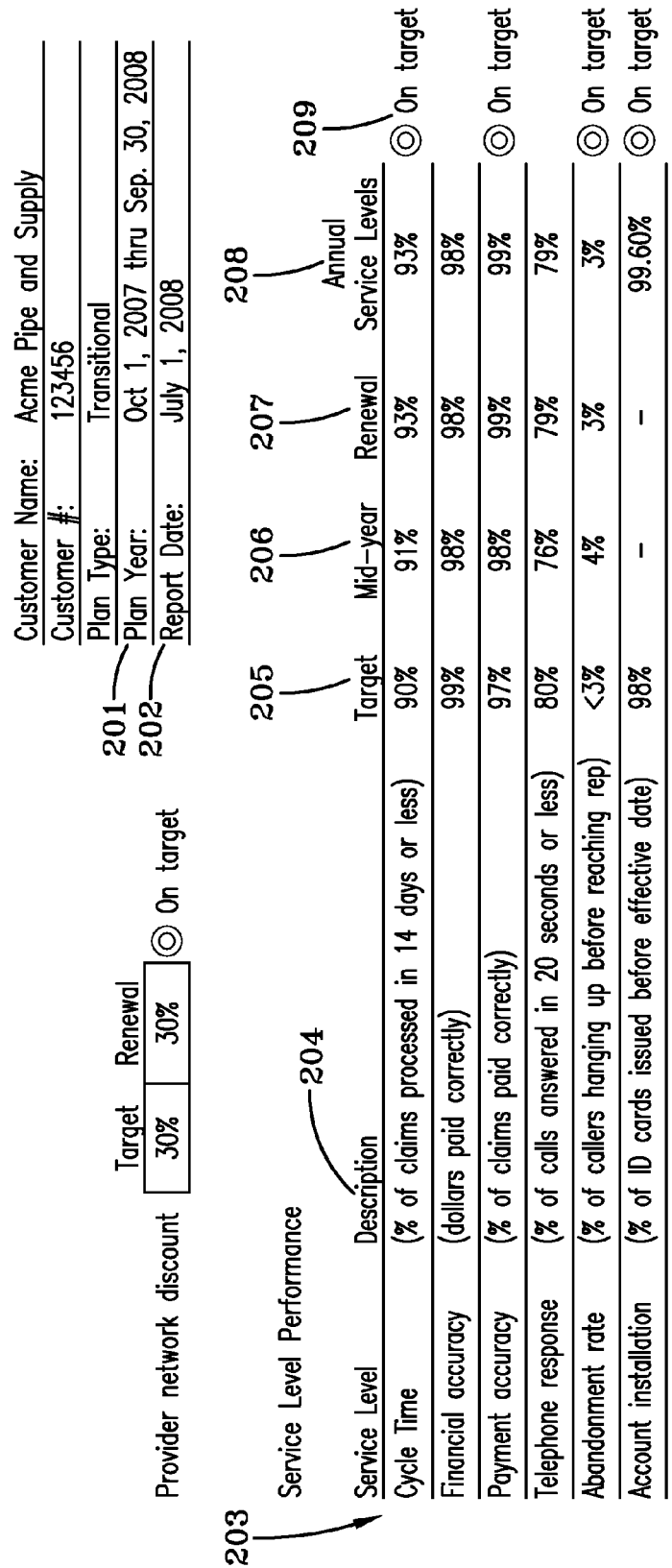
FIG. 2 is an illustration of a service performance scorecard.

Referring to FIG. 2, the plan year 201 provides the start and end dates of the current health plan. The report date 202 provides the date that the service performance scorecard was issued. The service performance factors 203 are each listed individually so that each one may be assigned a specific target 205 and tracked throughout the plan year. The description column 204 provides information on how specific service performance factors 203 are calculated.

Each service performance metric is given a target. If the health care plan administrator fails to meet the target, the base administrative fees charged by the health care plan administrator to the sponsor are reduced. Each of the six metrics may put an equal portion of the base administrative fees at risk, or each of the six metrics may be weighted such that different portions of the base administrative fees are at risk for each metric.

Cycle time may be defined as the percent of claims that are processed within a certain period of time. Financial accuracy may be defined as the percent of dollars that are paid correctly. Payment accuracy may be defined as the percent of claims that are paid properly. Telephone response may be defined as the percent of calls answered within a certain amount of time. Abandonment rate may be defined as a percent of callers who terminated their telephone call before reaching a customer service representative. Account installation may be defined as the percent of identification cards that are issued before a certain date.

In this exemplary embodiment, the service performance factors 203 are measured three times per plan year. The first time is shown in the mid-year column 206 which is six months after the current plan is initiated. The second time is shown in the renewal column 207 which is nine months after the current plan is initiated. The third time is shown in the annual service levels column 208 which is the most up-to-date information available on the service performance factors 203. As shown by the plan year 201 and report date 202, the annual service level column 208 represents the service performance measurements based on nine months of plan operation. Therefore, in FIG. 2 the renewal column 207 is equal to the annual service level column 208.

The target column 209 indicates which service level performance factors 203 hit the designated targets 205.

Tables 3-5 provide summaries of the information and data appearing on a scorecard for an example embodiment.

TABLE 3

Summary of Scorecard Metrics

| Member Engagement Metric | Description |
| --- | --- |
| Percent of valid telephone numbers for members age 18 and older provided by the sponsor (Weight: 35%) (Goal: 90%). | Phone numbers are needed for health care plan administrator to contact members and to connect with them for clinical program participation and other educational or message programs (e.g., "maximize your benefit" campaigns). |

TABLE 3-continued

Summary of Scorecard Metrics

| Member Engagement Metric | Description |
| --- | --- |
| Percent of members and spouses that complete the health assessment (Weight: 20%) (Goal: 50%) | Health assessments allow earliest possible identification of clinical conditions. |
| Percent of members eligible for clinical programs that participate (based on initial membership reset if a significant membership change occurs) (Weight: 30%) (Goal: 60%) | Clinical program participation can reduce claims costs for members with complex or chronic conditions. |
| Percent of members receiving prescription "Maximize Your Benefits" messaging that switch to the preferred medication (converted members/reached members) (Weight: 15%) (Goal: 25%) | Program messages are targeted at moving members to lower cost but just as clinically effective drug choices. Such changes can dramatically reduce claims costs. |
| Sponsor sending participation information for members in prior carrier's previous clinical programs (Yes/No) (Bonus - weight: 3%) | Previous clinical program participation data may be used to refer members into clinical programs. |
| Sponsor purchase of wellness program (Yes/No) (Bonus - weight: 3%) | Wellness program participation can help drive down long term claims costs. |

TABLE 4

Timeline of Scorecard Communications

| Time | Scorecard Details |
| --- | --- |
| 90 days pre-effective date | First meeting (scorecard mockup reviewed, no actual data) |
| Within 30 days post effective date | Second meeting (initial view of scorecard metrics progress) |
| Within the 4th month of the plan year | Mid-year meeting (updated view of scorecard metrics |
| 120 days prior to renewal | Scorecard finalized with the renewal quote |
| 120 days post effective date | Final true-up of actual claims costs to target and payout of any fees |

TABLE 5

Summary of Service Guarantees

| Service Guarantees | Description |
| --- | --- |
| Service Guarantees (Goal: 90%) | (% of claims processed in 14 days or less): |
| Financial Accuracy (Goal: 97%) | (% of dollars paid correctly): |
| Payment Accuracy (Goal: 97%) | (% of claims paid correctly |
| Telephone Response (Goal: 80%) | (% of calls answered in 20 seconds or less) |
| Abandonment Rate (Goal: 98%) | (% of callers hanging up before reaching customer service representative) |
| Account Installation (Goal: 98%) | (% of ID cards issued before effective date) |
| 20% of base administrative fees placed at risk for service; Maximum payout for all guarantees combined = 40% | |

During a settlement process following the first renewal of the program (e.g., 120 days), the health care plan administrator determines if the claims cost target guarantee has been met. Fees may be reduced, refunded, or credited depending on the difference between the target and actual participation. A baseline claims level using a projection when the case was originally rated is compared to the actual year one claims results to determine if the claims cost target guarantee has been met. A risk "corridor" or range is used to create a sliding scale for exceeding or falling short rather than requiring sponsors to meet exact targets. For example, the claim target may be considered hit if the actual claim cost per member per month is 2% under target to 2% over target. For each percent below or above the 2% threshold, 3% of the base administrative cost is recovered to or paid by the health care plan administrator. The maximum recovery or payment for the claim cost target may be capped (e.g., at 20%). Table 6 illustrates a "risk corridor" with 20% of base administrative fees at risk for claims cost targets and service performance.

TABLE 6

Risk Corridor: 20% Claim CostTarget and Service Performance Guarantee

| Administrative Fees At Risk with Maximum Payout of 40% | | |
| --- | --- | --- |
| Claim Cost Target PMPM | 20% | |
| Service Guarantees | 20% | |
| Total Fees at Risk | 40% | |
| Maximum Payment | 40% | |
| Claim Target Payment Risk Corridor | Percent of Administrative Fees | |
| Actual Claim Cost PMPM | Paid to Sponsor | Paid by Sponsor |
| 8.0% or more under Target | 20% | |
| 7.0% to 8.0% under Target | 18% | |
| 6.0% to 7.0% under Target | 15% | |
| 5.0% to 6.0% under Target | 12% | |
| 4.0% to 5.0% under Target | 9% | |
| 3.0% to 4.0% under Target | 6% | |
| 2.0% to 3.0% under Target | 3% | |
| 2.0% under to 2.0% over Target | 0% | 0% |
| 2.0% to 3.0% over Target | | 3% |
| 3.0% to 4.0% over Target | | 6% |
| 4.0% to 5.0% over Target | | 9% |
| 5.0% to 6.0% over Target | | 12% |
| 6.0% to 7.0% over Target | | 15% |
| 7.0% to 8.0% over Target | | 18% |
| 8.0% or more over Target | | 20% |

As indicated previously, different trend factors may be used depending upon the health care plan in effect. Table 7 shows different trend factors that may be applied to different plans (e.g., traditional, transitional, consumer directed).

TABLE 7

Summary of Claims Cost Target Guarantees

Claims Cost Target Guarantees

Set using a trend factor based on group plan and the results the group obtains on the various engagement metrics tracked on the scorecard.
Plan A (Traditional):
Minimum claims trend factor of 9%
Plan B (Transitional):
Minimum claims trend factor of 7.5%
Plan C (Consumer directed):
Minimum claims trend factor of 6%
All tiers: 20% of the administrative fee at risk if clams cost target is missed with shared savings for results better than the claims cost target.
A decreasing claims trend across the three tiers with the same percentage of the base administrative fees at risk in each tier. This approach allows health care plan administrator to provide most favorable arrangement based on sponsor commitment and participation. This approach also helps to highlight the value of member initiatives translating those sponsor commitments into better claims cost for the group.

TABLE 7-continued

Summary of Claims Cost Target Guarantees

Claims Cost Target Guarantees

Trend factors are target numbers only and the actual trend factor will vary from sponsor to sponsor based on the results of the engagement metrics.

Tables 8A and 8B illustrate application of a 6.0% trend cap for a consumer directed plan. Table 8A shows the target numbers and table 8B shows a sample case.

TABLE 8A

Consumer directed Plan - Target

| | Target | | |
| --- | --- | --- | --- |
| Category | Categories Weights | Participation | Score |
| Valid telephone Numbers | 35.00% | 90% | 31.50% |
| Health Assessment | 20.00% | 50% | 10.00% |
| Clinical Programs | 30.00% | 60% | 18.00% |
| Maximize Your Benefit | 15.00% | 25% | 3.75% |
| Program Participation Sub-total | 100.00% | | 63.25% |
| Previous Clinical Program Participation Bonus | | | 0.00% |
| Wellness Program Bonus | | | 0.00% |
| Program Participation Grand Total | | | 63.25% |

TABLE 8B

Consumer directed Plan - Sample Case

| | Sample Case | | |
| --- | --- | --- | --- |
| Categories | Category Weights | Participation | Score |
| Valid telephone Numbers | 35.00% | 90% | 31.50% |
| Health Assessment | 20.00% | 50% | 6.00% |
| Clinical Programs | 30.00% | 60% | 6.00% |
| Maximize Your Benefit | 15.00% | 15% | 2.25% |
| Program Participation Sub-total | 100.00% | | 45.75% |
| Previous Clinical Program Participation Bonus | | | 3.00% |
| Wellness Program Bonus | | | 3.00% |
| Program Participation Grand Total | | | 51.75% |
| Trend Cap = [target (63.25%)/participation score (51.75%)] × minimum trend (6.0%) | | | 7.33% |

Tables 9A and 9B illustrate application of a 7.5% trend cap for a transitional plan. Table 9A shows the target numbers and table 9B shows a sample case.

TABLE 9A

Transitional Plan Target

| | Target | | |
| --- | --- | --- | --- |
| Categories | Category Weights | Participation | Score |
| Valid telephone Numbers | 35.00% | 90% | 31.50% |
| Health Assessment | 20.00% | 50% | 10.00% |
| Clinical Programs | 30.00% | 60% | 18.00% |

TABLE 9A-continued

Transitional Plan Target

| Categories | Category Weights | Target Participation | Target Score |
|---|---|---|---|
| Maximize Your Benefit | 15.00% | 25% | 3.75% |
| Program Participation Sub-total | 100.00% | | 63.25% |
| Previous Clinical Program Participation Bonus | | | 0.00% |
| Wellness Program Bonus | | | 0.00% |
| Program Participation Grand Total | | | 63.25% |

TABLE 9B

Transitional Plan Sample Case

| Categories | Category Weights | Sample Case Participation | Sample Case Score |
|---|---|---|---|
| Valid telephone Numbers | 35.00% | 90% | 31.50% |
| Health Assessment | 20.00% | 50% | 6.00% |
| Clinical Programs | 30.00% | 60% | 6.00% |
| Maximize Your Benefit | 15.00% | 15% | 2.25% |
| Program Participation Sub-total | 100.00% | | 45.75% |
| Previous Clinical Program Participation Bonus | | | 3.00% |
| Wellness Program Bonus | | | 3.00% |
| Program Participation Grand Total | | | 51.75% |
| Trend Cap = [target (63.25%)/participation score (51.75%)] × minimum trend 7.5%) | | | 9.17% |

Tables 10A and 10B illustrate application of a 9.0% trend cap for a traditional plan. Table 10A shows the target numbers and table 10B shows a sample case.

TABLE 10A

Traditional Plan Target

| Categories | Category Weights | Target Participation | Target Score |
|---|---|---|---|
| Valid telephone Numbers | 35.00% | 90% | 31.50% |
| Health Assessment | 20.00% | 50% | 10.00% |
| Clinical Programs | 30.00% | 60% | 18.00% |
| Maximize Your Benefit | 15.00% | 25% | 3.75% |
| Program Participation Sub-total | 100.00% | | 63.25% |
| Previous Clinical Program Participation Bonus | | | 0.00% |
| Wellness Program Bonus | | | 0.00% |
| Program Participation Grand Total | | | 63.25% |

TABLE 10B

Traditional Plan Sample Case

| Categories | Category Weights | Sample Case Participation | Sample Case Score |
|---|---|---|---|
| Valid telephone Numbers | 35.00% | 90% | 31.50% |
| Health Assessment | 20.00% | 50% | 6.00% |
| Clinical Programs | 30.00% | 60% | 6.00% |
| Maximize Your Benefit | 15.00% | 15% | 2.25% |
| Program Participation Sub-total | 100.00% | | 45.75% |
| Previous Clinical Program Participation Bonus | | | 3.00% |
| Wellness Program Bonus | | | 3.00% |
| Program Participation Grand Total | | | 51.75% |
| Trend Cap = [target (63.25%)/participation score (51.75%)] × minimum trend 9.0%) | | | 11.00% |

In an example embodiment of the present invention, behavior modification credits may be offered for the transitional (e.g., 2.5% credit) and consumer directed plans (e.g., 5% credit). Behavior modification credits may be applied when member behavior is likely to change as a result of required communications and outreach programs.

Figure 3A:
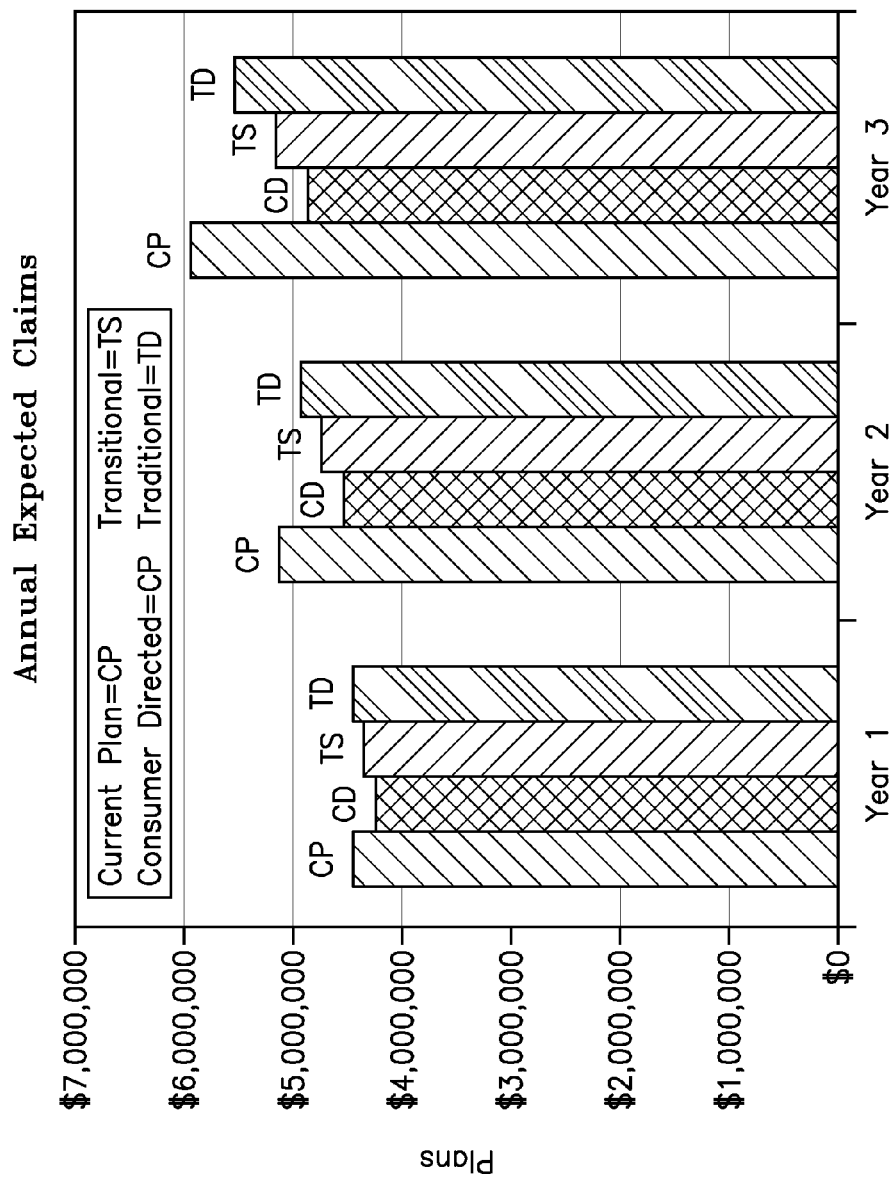
FIGS. 3A and 3B are graphical illustrations of potential costs savings for switching to a health plan program according to an example embodiment of the present invention.
Figure 3B:
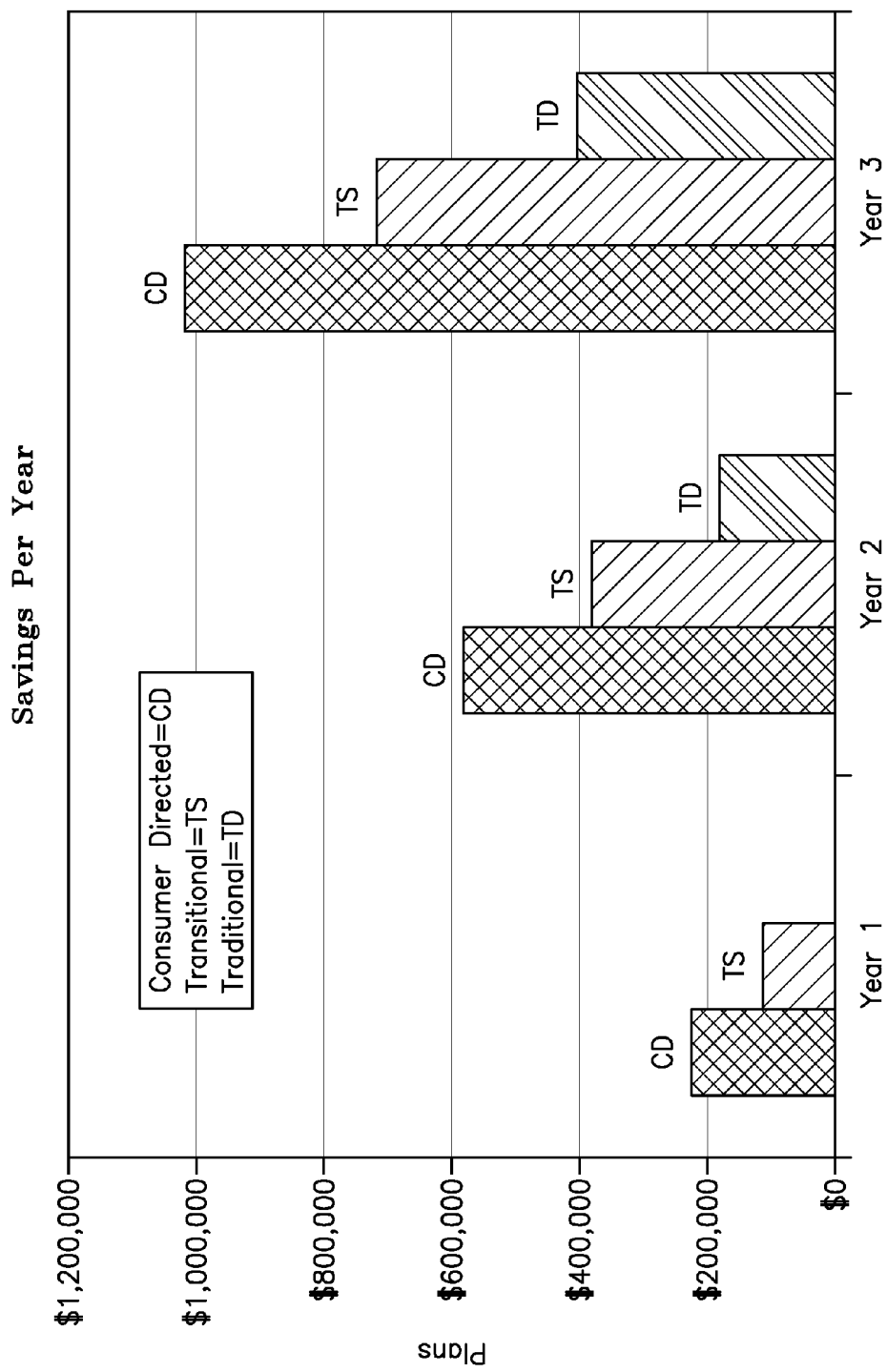

Referring to FIGS. 3A and 3B, graphical illustrations of potential costs savings for switching to a health plan program according to an example embodiment of the present invention is shown. Assuming a market trend of 15% cost increases each year, a current plan with a cost of $3,876,000 would cost 15% more each year as shown in table 11A.

TABLE 11A

Yearly Costs Assuming Market Trend of 15%

| | Current Plan |
|---|---|
| | $3,876,000 |
| Year 1 | $4,457,400 |
| Year 2 | $5,126,010 |
| Year 3 | $5,894,912 |

Recalculating the yearly costs based on a market trend for year 1 with a behavior modification credit of 2.5% for a transitional plan and a behavior modification credit of 5% for a consumer directed plan and using a trend cap calculated according to an example embodiment of the present invention for years 2 and 3, annual expected claims for various plan types are shown in FIG. 3A as reflected in table 11B.

TABLE 11B

Current Annual Expected Claims

| Consumer directed | Transitional | Traditional |
|---|---|---|
| $4,234,530 | $4,345,965 | $4,457,400 |
| $4,544,921 | $4,744,490 | $4,947,714 |
| $4,878,064 | $5,179,560 | $5,491,963 |

Annual expected savings for various plan types are shown in FIG. 3B as reflected in table 11C.

TABLE 11C

| | Savings Compared to Current | |
|---|---|---|
| Consumer directed | Transitional | Traditional |
| $222,870 | $111,435 | $0 |
| $581,089 | $381,520 | $178,296 |
| $1,016,848 | $715,352 | $402,949 |

Referring to FIG. 4, this figure is provided as a reference for a sample claims cost scorecard issued at the six month of the plan year.

Referring to FIG. 5, this figure is provided as a reference for a service performance scorecard issued at the six month of the plan year.

Referring to FIG. 6, this figure is provided as a reference for a claims cost scorecard issued at the first month of the plan year.

Referring to FIG. 7, this figure is provided as a reference for a service performance scorecard issued at the first month of the plan year.

The health care plan system and method of the present invention is a partnership between a health care plan administrator and a sponsor. When this partnership results in significant savings for the sponsor, the health care plan provide is paid back through a shared savings component. The shared savings component of the program ensures that incentives for health care plan administrator and the sponsor are entirely aligned.

While certain embodiments of the present invention are described in detail above, the scope of the invention is not to be considered limited by such disclosure, and modifications are possible without departing from the spirit of the invention as evidenced by the following claims:

What is claimed is:

1. A computerized method for tracking financial incentives to reduce health care claims costs comprising:
   (a) entering in a server at least one administrative fee charged by a health care plan administrator to a sponsor of a health care plan for a plurality of members of a member population;
   (b) entering in said server data for at least one plan activity requiring participation from said plurality of members;
   (c) entering in said server a target level of participation by said plurality of members in said plan activity;
   (d) determining at said server a number of members in a said health care plan;
   (e) determining at said server a number of members in said health care plan participating in said plan activity;
   (f) comparing at said server said number of members in said health care plan to said number of members participating in said plan activity to calculate a level of participation for said member population;
   (g) calculating by said server a difference between said level of participation and said target level of participation;
   (h) calculating by said server a claims cost target for said sponsor according to said difference between said level of participation and said target level of participation wherein said claims cost target is a cap on claims cost growth during an applicable health care plan period;
   (i) measuring at said server actual claims cost performance against said claims cost target for said applicable health care plan period to determine a claims cost difference for said member population; and
   (j) calculating at said server an administrative fee refunded to said sponsor or paid to said health plan administrator based on said claims cost difference for said member population.

2. The computerized method of claim 1 wherein said plan activity is selected from the group consisting of providing a valid telephone number, completing a health assessment, and participating in a health care program.

3. The computerized method of claim 2 wherein participating in a health care program comprising participating in a clinical program.

4. The computerized method of claim 3 wherein participating in a clinical program comprises participating in a clinical program for disease management.

5. The computerized method of claim 1 wherein calculating said administrative fee refunded to said sponsor according to said actual claims cost performance comprises calculating a refund amount for said sponsor only if said claims cost difference is less than a specified percentage.

6. The computerized method of claim 1 wherein setting a claims cost target comprises setting a claims cost target below a market trend.

7. The computerized method of claim 1 wherein said administrative fee is selected from the group consisting of medical claims administration, utilization, case management, radiology and transplant management, personal nurse care, predictive modeling, eligibility management, pharmacy administration, core wellness programs, toll free access to customer service via telephone, interactive voice response systems, and Internet, ongoing identification card administration, state surcharge reporting, annual plan sponsor summary for 5500 filing, bank and funding arrangements, employee and enrollment communication materials, standard monthly reporting package, summary plan description preparation, Internet access to summary plan description, and designated service unit.

8. The computerized method of claim 1 further comprising:
   (a) entering in said server at least one service performance metric related to administration services provided by said health care plan administrator to said sponsor for administration of said health care plan; and
   (b) reducing said administrative fee only if said health care plan administrator fails to meet said at least one service performance metric.

9. The computerized method of claim 8 wherein said service performance metric is selected from the group consisting of claims cycle time, financial accuracy, payment accuracy, telephone response rate, telephone abandonment rate, and account installation.

10. A computerized method for tracking reductions in a health care plan claims cost trend using financial incentives comprising:
   (a) entering in a server administrative fees charged by a health care plan administrator to a sponsor of a health care plan for a plurality of members of a member population;
   (b) entering in said server a plurality of member engagement factors related to plan activities completed by members of said health care plan;
   (c) establishing in said server member participation targets for each of said member engagement factors;
   (d) establishing in said server a claims cost target for said sponsor according to a measure of actual member participation against said member participation targets wherein said claims cost target is a cap on claims cost growth for said member population during an applicable health care plan period;

(e) comparing at said server actual claims cost data against said claims cost target for said applicable health care plan period to determine if growth in said claims cost is below said claims cost target; and (f) calculating at said server a reduction in said administrative fees charged to said sponsor if said growth in said claims cost for said member population is within a threshold level of said claims cost target.

11. The computerized method of claim 10 wherein said member engagement factors are selected from the group consisting of providing a valid telephone number, completing a health assessment, and participating in a health care program.

12. The computerized method of claim 11 wherein participating in a health care program comprising participating in a clinical program.

13. The computerized method of claim 12 wherein participating in a clinical program comprises participating in a clinical program for disease management.

14. The computerized method of claim 10 wherein said a threshold level of said claims cost target is 2%.

15. The computerized method of claim 10 wherein establishing a claims cost target comprises establishing a claims cost target below a market trend.

16. The computerized method of claim 10 wherein said administrative fees are selected from the group consisting of medical claims administration, utilization, case management, radiology and transplant management, personal nurse care, predictive modeling, eligibility management, pharmacy administration, core wellness programs, toll free access to customer service via telephone, interactive voice response systems, and Internet, ongoing identification card administration, state surcharge reporting, annual plan sponsor summary for 5500 filing, bank and funding arrangements, employee and enrollment communication materials, standard monthly reporting package, summary plan description preparation, Internet access to summary plan description, and designated service unit.

17. The computerized method of claim 10 further comprising:

(a) defining at least one service performance metric related to administration services provided by said health care plan administrator to said sponsor for administration of said health care plan; and (b) reducing said administrative fee to said sponsor only if said health care plan administrator fails to meet said at least one service performance metric.

18. The computerized method of claim 17 wherein said service performance metric is selected from the group consisting of claims cycle time, financial accuracy, payment accuracy, telephone response rate, telephone abandonment rate, and account installation.

19. The computerized method of claim 10 wherein said applicable health plan period is one calendar year.

20. The computerized method of claim 10 further comprising revising said claims cost target for a second applicable health plan period based on said member participation targets.

* * * * *